(12) United States Patent
Wilde et al.

(10) Patent No.: US 12,169,891 B2
(45) Date of Patent: Dec. 17, 2024

(54) STYLIZED ANIMATABLE REPRESENTATION

(71) Applicant: Microsoft Technology Licensing, LLC, Redmond, WA (US)

(72) Inventors: Daniel Stephen Wilde, Cambridge (GB); Xian Xiao, London (GB); Marta Malgorzata Wilczkowiak, Cambridge (GB); Thomas Joseph Cashman, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 60 days.

(21) Appl. No.: 18/058,263

(22) Filed: Nov. 22, 2022

(65) Prior Publication Data

US 2024/0169634 A1    May 23, 2024

(51) Int. Cl.
G06T 17/20     (2006.01)
G06T 13/40     (2011.01)

(52) U.S. Cl.
CPC ............. G06T 13/40 (2013.01); G06T 17/20 (2013.01)

(58) Field of Classification Search
CPC ....... G06T 11/001; G06T 13/40; G06T 17/20; G06T 19/20; G06T 7/149
See application file for complete search history.

(56) References Cited

U.S. PATENT DOCUMENTS

2003/0095701 A1* 5/2003 Shum ................ G06V 40/16
                                            382/190
2019/0259214 A1* 8/2019 Abdrashitov ........... G06T 13/40

FOREIGN PATENT DOCUMENTS

WO     2016161553 A1    10/2016

OTHER PUBLICATIONS

Alexa, et al., "As-Rigid-As-Possible Shape Interpolation", in Proceedings of the 27th annual conference on Computer graphics and interactive techniques, Jul. 1, 2000, pp. 157-164.
Baran, et al., "Automatic Rigging and Animation of 3D Characters", in Journal of ACM Transactions on Graphics, vol. 26, Issue 3, Jul. 29, 2007, 8 Pages.
Bergeron, et al., "Controlling facial expressions and body movements in the computer-generated animated short "Tony de Peltrie"", Retrieved from: https://ohiostate.pressbooks.pub/app/uploads/sites/45/2017/09/Bergeron.pdf, 1985, 3 Pages.
Botsch, et al., "On Linear Variational Surface Deformation Methods", in Journal of IEEE Transactions on Visualization and Computer Graphics vol. 14, Issue 1, Jan. 2008, pp. 213-230.

(Continued)

*Primary Examiner* — Antonio A Caschera
(74) *Attorney, Agent, or Firm* — Barta Jones, PLLC

(57) ABSTRACT

There is a method of computing a stylized, animatable representation of a subject from a family of stylized animatable representations. The method comprises: accessing a realistic representation of the subject; computing a mesh mapping using a model that was formed using a data set of training examples which pair realistic representations of other subjects with instances of the family. The method also comprises applying the mesh mapping to the realistic representation of the subject to produce a target mesh; and selecting the stylized animatable representation from the family, by assessing closeness of the target mesh with instances of the family.

20 Claims, 5 Drawing Sheets

(56) References Cited

OTHER PUBLICATIONS

Boyd, et al., "Convex Optimization", in the Book of Cambridge University Press, Mar. 8, 2004, 730 Pages.
Der, et al., "Inverse Kinematics for Reduced Deformable Models", in ACM Transactions on Graphics, vol. 25, Issue 3, Jul. 1, 2006, 6 Pages.
Feng, et al., "Real-time Data Driven Deformation using Kernel Canonical Correlation Analysis", in Journal of ACM Transactions on Graphics, vol. 27, Issue 3, Aug. 1, 2008, 9 Pages.
Fröhlich, et al., "Example-Driven Deformations Based on Discrete Shells", in Journal of Computer Science forum vol. 30, Issue 8, Aug. 18, 2011, pp. 2246-2257.
Gao, et al., "A Data-Driven Approach to Realistic Shape Morphing", in Journal of Computer Graphics Forum, vol. 32, Issue 2, May 6, 2013, pp. 449-457.
Gill, et al., "SNOPT: An SQP Algorithm for Large-Scale Constrained Optimization", in Journal of SIAM Review vol. 47, Issue 1, Jan. 1, 2005, pp. 99-131.
Grochow, et al., "Style-Based Inverse Kinematics", in Journal of ACM Transactions on Graphics, vol. 23, Issue 3, Aug. 1, 2004, 10 Pages.
Hahn, et al., "Subspace Clothing Simulation Using Adaptive Bases", in Journal of ACM Transactions on Graphics, vol. 33, Issue 4, Jul. 27, 2014, 8 Pages.
Huang, et al., "Controllable Hand Deformation from Sparse Examples with Rich Details", in Proceedings of the 2011 ACM SIGGRAPH/ Euro graphics Symposium on Computer Animation, Aug. 5, 2011, 10 Pages.
Igarashi, et al., "As-Rigid-As-Possible Shape Manipulation", in Journal of ACM Transactions on Graphics, vol. 24, Issue 3, Jul. 1, 2005, 8 Pages.
Jacobson, et al., "Bounded Biharmonic Weights for Real-Time Deformation", in Journal of ACM Transactions on Graphics, vol. 30, Issue 4, Jul. 25, 2011, 8 Pages.
Jacobson, et al., "Fast Automatic Skinning Transformations", in Journal of ACM Transactions on Graphics, vol. 31, Issue 4, Jul. 1, 2012, 10 Pages.
Jacobson, et al., "Smooth Shape-Aware Functions with Controlled Extrema", in Journal Eurographics Symposium on Geometry Processing, vol. 31, Issue 5, Aug. 2012, 10 Pages.
Jones, et al., "Dynamic Sprites", in Proceedings of Motion on Games, Nov. 6, 2013, pp. 17-24.
Jones, et al., "Example-based Plastic Deformation of Rigid Bodies", in Journal of ACM Transactions on Graphics, vol. 35, Issue 4, Jul. 24, 2016, 11 Pages.
Kilian, "Geometric Modeling in Shape Space", in Journal ACM Transactions on Graphics vol. 26, Issue 3, Jul. 29, 2007, 8 Pages.
Koyama, et al., "Real-Time Example-Based Elastic Deformation", in Journal of ACM SIGGRAPH Symposium on Computer Animation, Jul. 29, 2012, 6 Pages.
Levi, et al., "Smooth Rotation Enhanced As-Rigid-As-Possible Mesh Animation", in Journal of IEEE Transactions on Visualization and Computer Graphics vol. 21, Issue 2, Feb. 1, 2015, pp. 264-277.
Lewis, et al., "Direct Manipulation Blendshapes", in Journal of IEEE Computer Graphics and Applications vol. 30, Issue 4, Jul. 2010, pp. 42-50.
Lewis, et al., "Pose Space Deformation: A Unified Approach to Shape Interpolation and Skeleton-Driven Deformation", in Proceedings of the 27th annual conference on Computer graphics and interactive techniques, Jul. 1, 2000, pp. 165-172.
Liu, et al., "A Local/Global Approach to Mesh Parameterization", in Journal of Computer Graphics Forum vol. 27, Issue 5, Jul. 2, 2008, 10 Pages.
Martin, et al., "Example-Based Elastic Materials", in Journal of ACM Transactions on Graphics, vol. 30, Issue 4, Jul. 25, 2011, 8 Pages.
Milliez, et al., "Mutable elastic models for sculpting structured shapes", in Journal of Computer Graphics Forum, vol. 32, Issue 2, 2013, pp. 21-30.

Nieto, et al., "Cage Based Deformations: A Survey", in Part of the Lecture Notes in Computational Vision and Biomechanics book series, vol. 7, Oct. 30, 2012, pp. 75-99.
Schumacher, et al., "Efficient Simulation of Example-Based Materials", in Proceedings of the ACM SIGGRAPH/Euro graphics Symposium on Computer Animation, Jul. 29, 2012, 8 Pages.
Sederberg, "Free-Form Deformation of Solid Geometric Models", in ACM SIGGRAPH Computer Graphics vol. 20, Issue 4, Aug. 18, 1986, pp. 151-160.
Seo, et al., "Compression and Direct Manipulation of Complex Blendshape Models", in Proceedings of the SIGGRAPH Asia Conference, Dec. 12, 2011, 10 Pages.
Sheffer, et al., "Pyramid Coordinates for Morphing and Deformation", in Proceedings of the 2nd International Symposium on 3D Data Processing, Visualization and Transmission, Sep. 9, 2004, 8 Pages.
Sloan, et al., "Shape by Example", in Proceedings of the Symposium on Interactive 3D Graphics, Mar. 1, 2001, 9 Pages.
Chao et al., "A Simple Geometric Model for Elastic Deformations", in Journal of ACM Transactions on Graphics, vol. 29, Issue 4, Jul. 26, 2010, 6 Pages.
Sorkine, "As-Rigid-As-Possible Surface Modeling", in Proceedings of the Fifth Eurographics Symposium on Geometry Processing, Jul. 4, 2007, pp. 109-116.
Sumner, et al., "Deformation Transfer for Triangle Meshes", in Journal of ACM Transactions on Graphics vol. 23, Issue 3, Aug. 1, 2004, 7 Pages.
Sumner, et al., "Mesh-Based Inverse Kinematics", in Journal of ACM Transactions on Graphics vol. 24, Issue 3, Jul. 1, 2005, pp. 488-495.
Twigg, et al., "Point Cloud Glue: Constraining simulations using the Procrustes transform", in Proceedings of ACM SIGGRAPH Symposium on Computer Animation, Jul. 2, 2010, pp. 45-53.
Wang, et al., "Linear Subspace Design for Real-Time Shape Deformation", in Journal of ACM Transactions on Graphics vol. 34, Issue 4, Jul. 27, 2015, 11 Pages.
Wareham, et al., "Bone Glow: An Improved Method for the Assignment of Weights for Mesh Deformation", in Proceedings of the International Conference on Articulated Motion and Deformable Objects, Jul. 9, 2008, pp. 63-71.
Weber, et al., "Context-Aware Skeletal Shape Deformation", in Journal of Eurographic vol. 26, Issue 3, Oct. 12, 2007, pp. 265-274.
Zhang, et al., "Real-Time Subspace Integration for Example-Based Elastic Material", in Journal Computer Graphics Forum, vol. 34, Issue 2, May 1, 2015, pp. 395-404.
Zhang, et al., "Spacetime Faces: High Resolution Capture for Modeling and Animation", in Journal ACM Transactions on Graphics, vol. 23, Issue 3, Aug. 1, 2004, pp. 248-276.
Song, et al., "Fast corotational simulation for example-driven deformation", in Journal of Computers & Graphics, vol. 40, May 1, 2014, pp. 49-57.
"The Golden Ratio in Greek Art and Architecture", Retrieved From: https://canukeepup.wordpress.com/2009/07/17/the-golden-ratio-in-greek-art-architecture/, Jul. 17, 2009, 3 Pages.
Wampler, Kevin, "Fast and Reliable Example-Based Mesh IK for Stylized Deformations", in Journal of ACM Transactions on Graphics, vol. 35, Issue 6, Dec. 5, 2016, 12 Pages.
Danieau, et al., "Automatic Generation and Stylization of 3D Facial Rigs", IEEE Conference on Virtual Reality and 3D User Interfaces, Mar. 23, 2019, pp. 784-792.
International Search Report and Written Opinion received for PCT Application No. PCT/US23/033770, mailed on Mar. 4, 2024, 16 pages.
Ye, et al., "3D-CariGAN: An End-to-End Solution to 3D Caricature Generation from Face Photos", arXiv:2003.06841v1, Mar. 15, 2020, 17 pages.
Zhou, et al., "3D cartoon face generation by local deformation mapping", Visual Computer, Springer, vol. 32, Jun. 10, 2016, pp. 717-727.

* cited by examiner

STYLIZED ANIMATABLE REPRESENTATION

BACKGROUND

Avatars of people or animals are useful for many applications including but not limited to video games, video conferencing, telepresence, virtual reality, augmented reality, metaverse and more.

In order to render avatars of people or animals to create an animation, a 3D model of the person or animal is typically used. The 3D model is an animatable representation. By controlling pose of the 3D model (where pose is 3D position and orientation) and rendering 2D images (depicting the person or animal as an avatar) from the posed 3D model it is possible to create animations. Generally speaking, the complexity of the 3D model increases in order to increase the precision of control of the 3D model in order to depict fine detail such as facial expressions, movements of fingers, nuanced movements of the body.

The embodiments described below are not limited to implementations which solve any or all of the disadvantages of known stylized animatable representations.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples a stylized animatable representation is created for a subject such as a particular human or animal. The representation is personalized in that it has a likeness to the particular subject. In some examples the stylized animatable representation is a 3D rigged model.

In various examples there is a method of computing a stylized, animatable representation of a subject from a family of stylized animatable representations. The method comprises the steps of: accessing a realistic representation of the subject; computing a mesh mapping using a model that was formed using a data set of training examples which pair realistic representations of other subjects with instances of the family. The method also comprises applying the mesh mapping to the realistic representation of the subject to produce a target mesh; and selecting the stylized animatable representation from the family, by assessing closeness of the target mesh with instances of the family.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
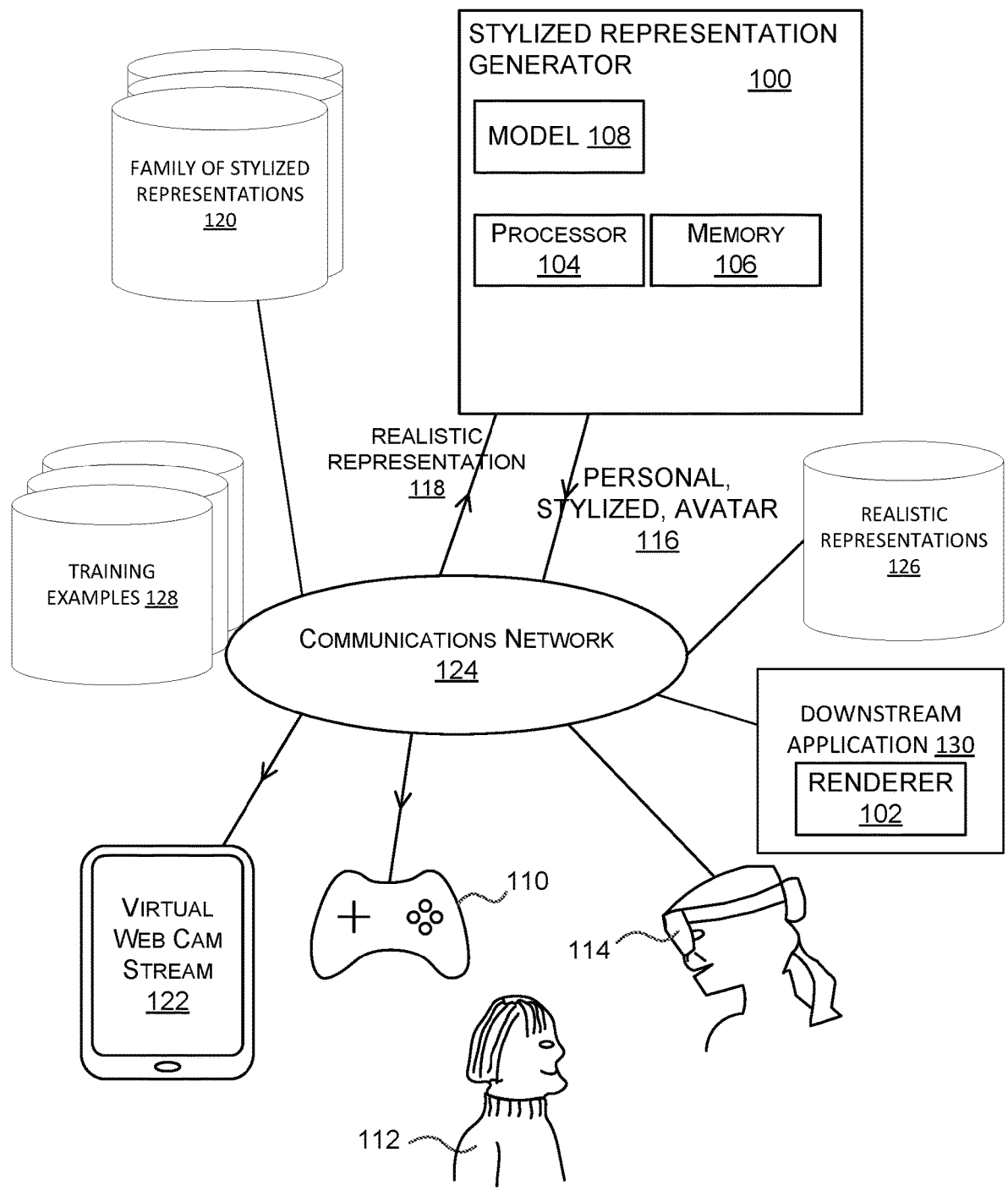
FIG. 1 shows a stylized representation generator deployed as a cloud service.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

The term "animatable representation" is used herein to refer to a 3D model of a person or animal where the pose of the 3D model is controllable using parameters of the 3D model. In some examples the animatable representation is articulated in that it comprises at least one joint such as a neck joint, shoulder joint, hip joint or other joint. In some examples the animatable representation is rigged in that it comprises one or more controls such as a joint, or group of joints. In a non-limiting example a group of joints is a skeleton or part of a skeleton. In some examples the animatable representation comprises at least one blendshape which is a function representing a facial muscle action or other deformation, which may be non-articulated, such as the movement of hair or the appearance of wrinkles. In some examples the animatable representation is a rigged 3D mesh or a rigged smooth surface 3D model.

As mentioned above, in order to render avatars of people or animals to create an animation, a 3D model of the person or animal is typically used. By controlling pose of the 3D model (where pose is 3D position and orientation) and rendering 2D images from the posed 3D model it is possible to create animations. Where the 3D model depicts a subject, such as a person or animal, with high fidelity photoreal 2D images may be rendered. However, avatars which are close to realistic, but not perfectly photoreal, suffer from the "uncanny valley" problem whereby users may experience a negative emotional response when viewing such synthetic images of people or animals.

As mentioned above, avatars of people or animals are useful for many applications including but not limited to video games, video conferencing, telepresence, virtual reality, augmented reality, metaverse and more. The inventors have recognized that in these applications an aim of using avatars is to facilitate human computer interaction and/or human communication. Having close to photoreal avatars may hinder human computer interaction (due to the uncanny valley problem). Close to photoreal avatars are also computationally expensive to compute and use significant resources such as memory and power. Therefore, the inventors have recognized that stylized avatars are beneficial for facilitating human computer interaction and/or human communication. A stylized avatar is a depiction of a person or animal which is semi-realistic. A stylized avatar may be a depiction of a person or animal where at least one feature of the person or animal is enlarged or reduced with respect to another feature of the person or animal. A non-exhaustive list of features is: body stance, eye shape, nose shape, chin shape. Using stylized avatars also enables resources such as memory and power to be saved as compared with using photoreal avatars.

However, the inventors have found that it is very difficult to create animatable representations which are stylized and which also preserve a likeness of a personal or animal in a scalable manner. Such animatable representations are said to be personalized since they retain a likeness of a particular subject (person or animal). Since there are potentially hundreds of millions of individual subjects (for web scale applications), being able to compute a stylized animatable representation for each of these individuals is a huge task. Being able to do so in a way which preserves identity or retains likeness of individuals is challenging.

The inventors have developed a way of using training examples to compute a stylized, animatable representation of a subject in a computationally efficient, scalable manner.

FIG. 1 is a schematic diagram of a stylized representation generator 100 which is computer implemented. The stylized representation generator comprises a model 108, at least one processor 104 and a memory 106.

In the example of FIG. 1 the stylized representation generator 100 is deployed at a computing entity in communication with communications network 124. The communications network is the internet, an intranet or any other communications network. The stylized representation generator receives input comprising a realistic representation 118. The realistic representation 118 is a 3D model of a subject such as a person or animal. In some cases the realistic representation 118 is computed from at least one 2D image of the subject. In some cases the realistic representation 118 is obtained from a store 126 via communications network 124. The output of the stylized representation generator 100 is a 3D model of a subject in stylized form. The 3D model is sent to a downstream application 130 to render 2D images animating an avatar of the subject using renderer 102. A non-exhaustive list of downstream applications is: video conferencing application, video game application, film creation application, telepresence application, virtual assistants. In some cases the downstream application 130 is deployed in an end user computing device.

The output from renderer 102 comprises 2D images, which may be sent to an end user device such as by one or more of: being inserted into a virtual web cam stream for display at smart phone 122, inserting into a video game being controlled using game console 110, display via a head worn computing device 114. The renderer 102 is any functionality for computing a 2D image from a 3D model, such as by using ray tracing, ray casting, neural rendering, rasterization or in other ways. A non-exhaustive list of example renderers which may be used is: SolidWorks Visualize (trade mark), Sunflow (trade mark), LuxCoreRender (trade mark), Unity (trade mark).

As mentioned above, the stylized representation generator 100 comprises a model 108. The model 108 was formed using a data set of training examples which pair realistic representations of other subjects with instances of the family. In some examples the model is a trained machine learning model. In other examples the model is used to compute the mesh mapping using vertex displacements observed in a plurality of training examples. In some examples the model is used to compute at least one warp such as a 3D space warp. The term "3D space warp" is used to refer to a function from one location in 3D space to another location (or equivalently, a function from a location in 3D space to a displacement vector).

The stylized representation generator has access to at least one family 120 of stylized representations. Each family comprises a potentially infinite number of stylized representations where each stylized representation is a rigged 3D model of a person or animal. In an example, instances of a family are reached by varying values of continuous parameters of a complex rigged 3D model of a person or animal. Within a family the stylized representations have the same style. For example, a style of a given family may comprise enlarged eyes; a style of another family may comprise a specified ratio of lengths of limb with respect to a full body. Within a family each stylized representation is a rigged 3D model depicting a particular subject (person or animal) where the subject is real or synthetic. The stylized representations are computationally expensive to create and are created in advance and stored in databases or other storage accessible to the stylized representation generator 100 via communications network 124.

The stylized representation generator 100 has access to a plurality of sets of training examples 128 via communications network 124. Each training example is a pair comprising a realistic item and a stylized version of the realistic item created by a human artist. The realistic item is a realistic image of a subject (such as a photograph or video frame) or a realistic 3D mesh model, or a plurality of images captured by an offline multicamera capture rig which may be used to create a realistic 3D mesh model. A stylized version of the realistic item is a 3D mesh model where a human artist has manually set values of parameters of a rig of the 3D mesh model. There is one set of training examples per family. Each set of training examples comprises a plurality of training examples. In some embodiments the number of training examples is a set is small, such as around 20. In some embodiments there are many thousands of training examples per set. More detail about the training examples is given with reference to FIG. 2.

In one example, a user is wearing a head worn computing device 114 and participating in a video call. A remote participant of the video call is visible to the user as a hologram 112. The hologram is stylized and is generated using stylized representation generator 100. The remote participant has an account with a provider of the video call and associated with the account is a stored realistic representation of the remote participant. In an example, a 2D image of the remote participant is obtained and used to compute a realistic representation comprising a 3D model of the remote participant. The realistic representation is stored in store 126. The video call provider determines the account of the remote participant and accesses the realistic representation from store 126. The realistic representation is sent to stylized representation generator 100. The stylized representation generator 100 generates a stylized representation which is a 3D rigged model. The 3D rigged model is then used by downstream application 130 and renderer 102 to create hologram 112 for display by head worn computing device 114. The hologram 112 facilitates a video call between the remote participant and the wearer of the head worn computing device.

The stylized representation generator 100 of the disclosure operates in an unconventional manner to achieve stylized, animatable representations which may preserve likeness of a person or animal.

By using training examples 128 to compute a mesh mapping the stylized representation generator 100 is able to improve the functioning of a computing device by computing stylized animatable representations which facilitate human computer interaction.

In the example of FIG. 1 the stylized representation generator 100 is deployed at a computing entity remote from the end user devices or downstream applications. However, in some cases the stylized representation generator 100 functionality is deployed at an end user device or at a computing entity providing a downstream application 130. In other examples, the functionality of the stylized representation generator 100 is shared between the stylized representation generator 100 and at least one other computing device such as an end user computing device 110, 114, 122 or a computing device providing a downstream application 130.

Alternatively, or in addition, the functionality of the stylized representation generator 100 described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
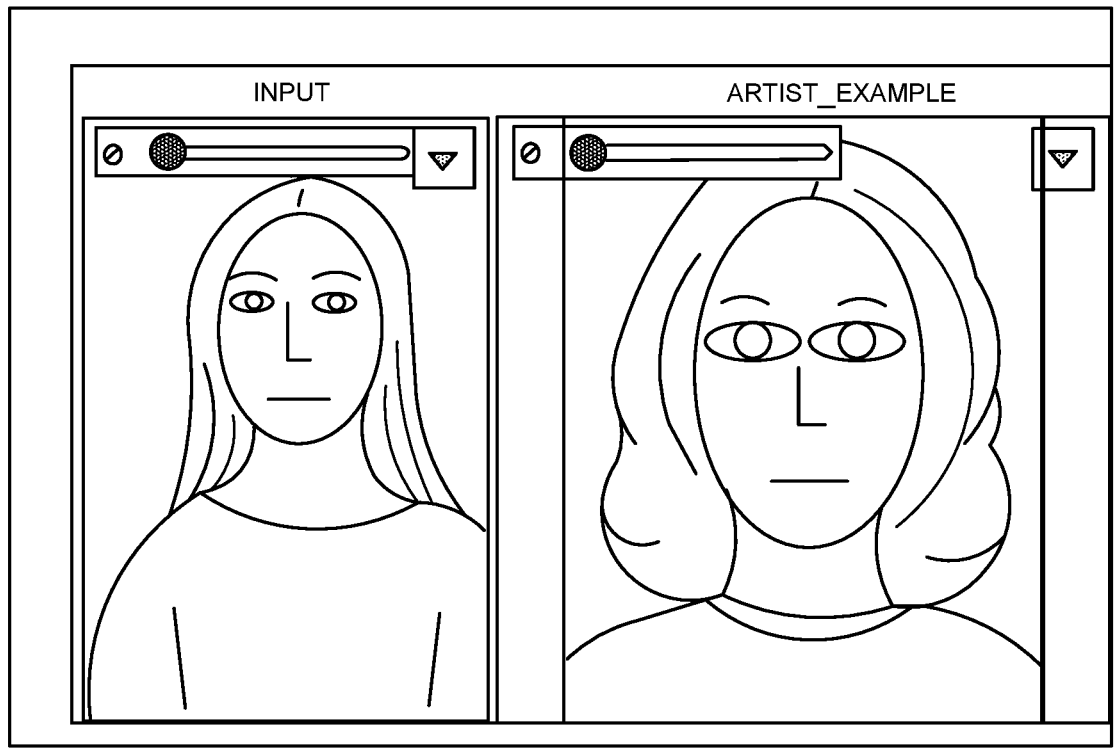
FIG. 2 is a schematic diagram of a training example.

FIG. 2 is a schematic diagram of a training example comprising a 2D image 200 of a subject and a corresponding stylized picture 204 of the subject created by a human artist. The image 200 is a photograph or video frame of the subject such as captured by a video camera, web camera, smart phone camera, or other digital camera. In the example of FIG. 2 the image 200 of the subject shows a head and shoulders of a woman facing the camera. The woman has long straight hair with a centre parting, is wearing a blue top and has a neutral expression. The corresponding stylized picture 204 shows a head and shoulders of a woman facing the camera, with wavy hair just above shoulder length, a centre parting, wearing a blue top and with a neutral expression. The eyes are larger in the stylized picture 204 than in the image 200. Note that the training example in FIG. 2 is shown as a black and white line drawing whereas an actual training example may comprise color digital images. FIG. 2 is thus a schematic diagram of one training example such as may be stored in training examples 128 of FIG. 1.

Figure 3:
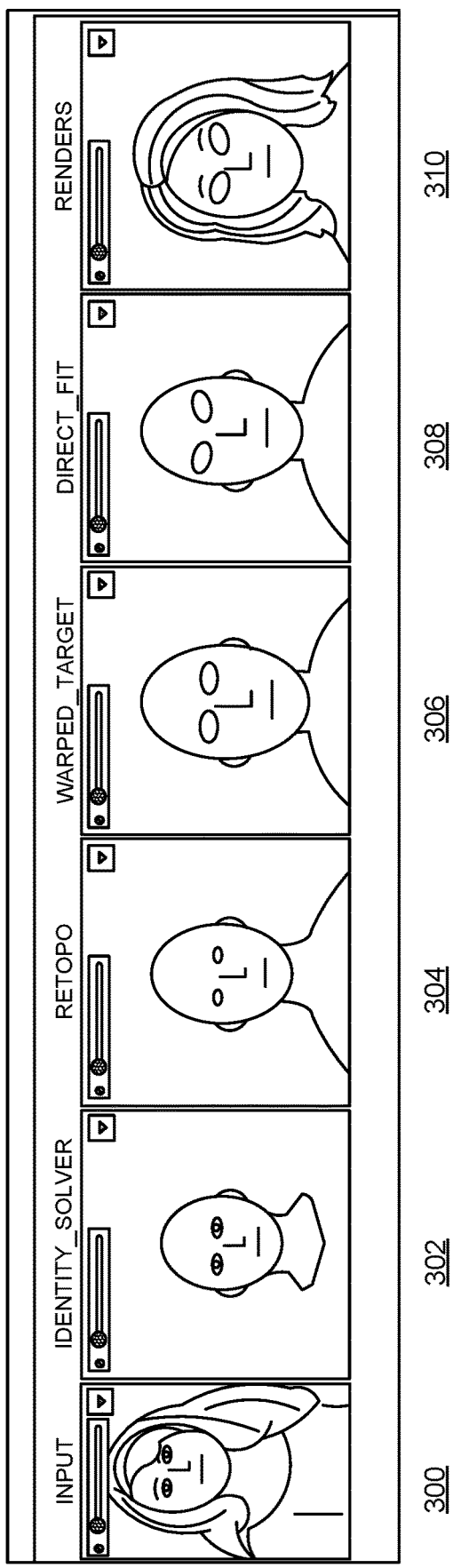
FIG. 3 is a schematic diagram of a 2D image of a subject and showing stages of processing to produce a stylized avatar of the subject.

FIG. 3 is a schematic diagram of a 2D image 300 of a subject and showing stages of processing to produce a 2D image 310 of a stylized avatar 310 of the subject. There is a 2D image 300 of a subject. The 2D image is not available in the training examples 128. The 2D image is a digital photograph captured by an image capture device such as any of: a web camera, a smart phone camera, a video camera, a red green blue camera. The 2D image is used to create a realistic representation of the subject where the realistic representation is a 3D model such as a rigged 3D model. In FIG. 2 the realistic representation is shown schematically at 302 which is a black and white line drawing schematically illustrating an 3D model of the subject. The realistic representation 302 depicts the subject realistically.

In an example, the 2D image is used to create the realistic representation using technology to reconstruct a 3D model using dense landmarks. A trained machine learning model is used to predict the locations of dense landmarks in the 2D image. A 3D model is then fitted to the predicted locations of the dense landmarks. The machine learning model is trained using synthetic training data which gives ground truth landmark annotations. Using this approach gives a benefit of only a single 2D image of the subject being used whilst accuracy of the 3D model is high.

In another example, the 2D image is one of a plurality of 2D images of the subject captured using a camera rig. Since the locations of the cameras in the rig are known and the images are captured at the same time from different viewpoints it is possible to construct a 3D model of the subject using geometry and information about parameters of the cameras.

In various examples, the 3D model 302 is a 3D mesh model formed from a plurality of polygons.

In some, but not all embodiments, the 3D model 302 is processed to change a number of polygons of the 3D mesh to a target number of polygons. The resulting 3D mesh 304 is shown schematically in FIG. 3.

A mesh mapping is applied to the 3D model 302 (or the 3D model 304). The mesh mapping is found using the model 108 as explained in more detail below. The result of applying the mesh mapping is shown schematically at 306 in FIG. 3 and is referred to as a target mesh 306.

The target mesh 306 is used to select an instance 308 from a family 120 of stylized animatable representations. The target mesh 306 is less complex than the instances in the family 120 and so by selecting an instance from the family a more powerful representation is obtained which is stylized and which is able to preserve likeness or preserve identity of the subject. The instance from the family is more powerful in that it may be animated with greater precision and finesse than the target mesh 306. The selected instance 308 is the stylized animatable representation of the subject which may then be used by a downstream application 130 to render a 2D image 310 of the subject in stylized form. The 2D image 310 of the subject in stylized form retains a likeness of the subject as depicted in realistic 2D image 300.

Although the example in FIG. 3 shows the subject face forward with a neutral expression, the 2D image 310 is able to depict the subject with different poses and/or different expressions. This is achieved by changing pose parameters of the stylized animatable representation 308 prior to rendering.

Figure 4:
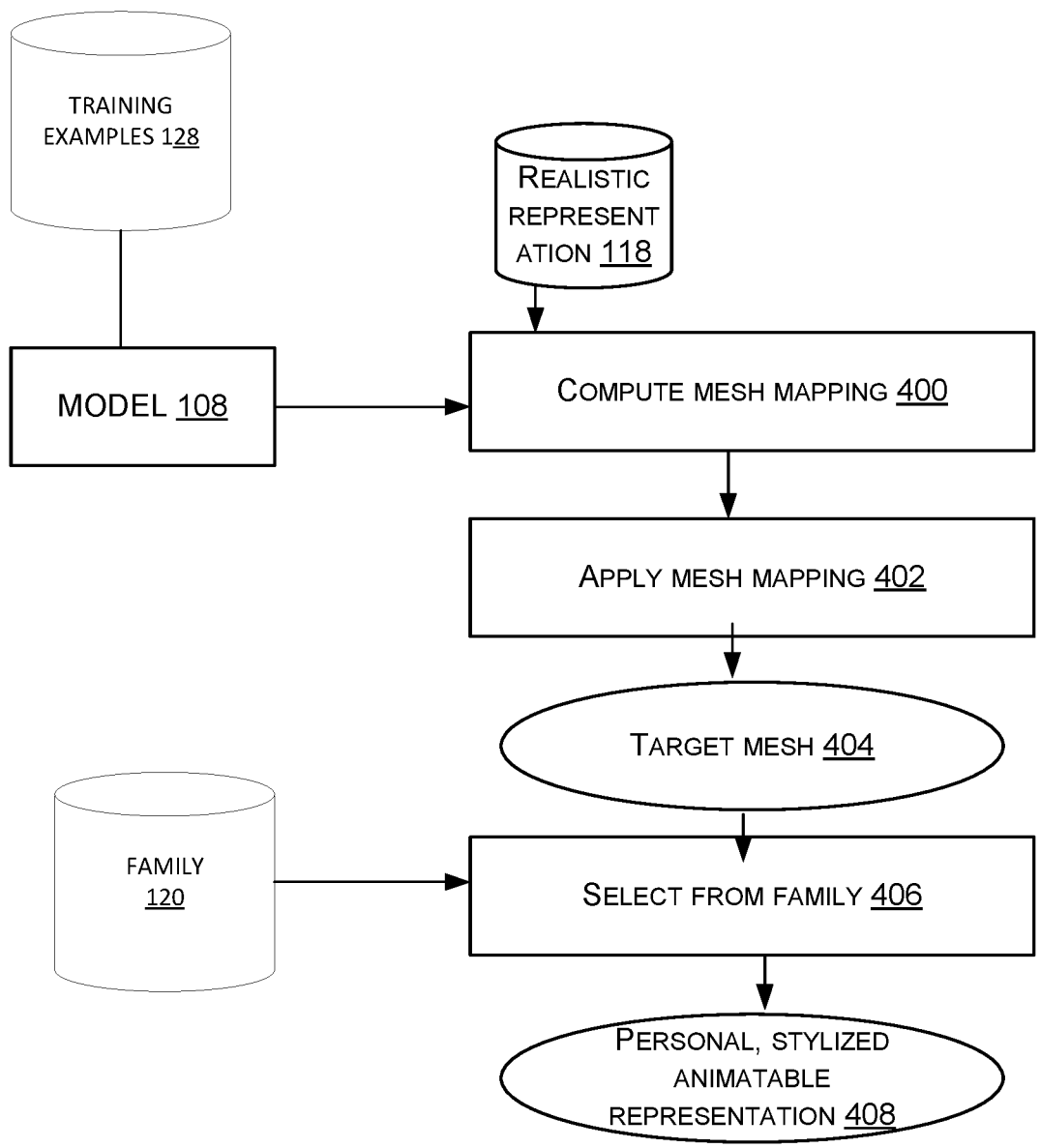
FIG. 4 is a flow diagram of a method of computing a stylized, animatable representation of a subject.

FIG. 4 is a flow diagram of a method of computing a stylized, animatable representation of a subject from a family 120 of stylized animatable representations. In an example, the method of FIG. 4 is performed by the stylized representation generator 100 of FIG. 1. A realistic representation 118 of a subject is accessed. In an example the realistic representation 118 is accessed from a store 126 via a communications network such as a store of 3D mesh models of individual subjects. In an example, the subjects have registered with a service and have provided a 2D image of themselves which has been used to compute a 3D mesh model depicting the subject. In another example, the realistic representation is received from another computing entity such as a telepresence service or an online game application.

The stylized representation generator 100 computes 400 a mesh mapping using a model 108 that was formed using a data set of training examples 128 which pair realistic representations of other subjects with instances of the family 120. More detail about the model 108 is given below.

The stylized representation generator 100 applies 402 the mesh mapping to the realistic representation of the subject to produce a target mesh 404; that is the target mesh 404 is the result of the applying operation. In FIG. 3 the item 306 is an example of a target mesh with a smooth surface applied and drawn as a line drawing. The stylized representation generator 100 selects 406 an instance from the family 120 by assessing closeness of the target mesh 404 with instances of the family 120. Thus the operation of assessing closeness can be considered part of the selecting operation 406. An instance from the family is selected on the basis of the closeness of the instance to the target mesh. Any suitable way of assessing closeness is used such as computing a similarity metric or computing an optimization. The selected instance is a stylized animatable representation 408 of the subject which preserves likeness of the subject.

In various examples, assessing closeness of the target mesh with instances of the family comprises optimizing an energy function comprising a geometrical residual term (landmark or vertex difference) and identity prior term (penalizing extreme identity coefficients or unlikely combinations of identity coefficients). In various examples, assessing closeness of the target mesh with instances of the family comprises fitting the target mesh to the family by computing an optimization as now described:

Let $\beta$ be the identity parameters of the target family.

Let $M(\beta)$ be the mesh of a personalized rig in the target family.

Let T be the transformed (e.g. warped) target mesh.

An energy minimization algorithm and energy terms are used to solve for optimal target family identity parameters given the transformed (e.g. warped) target mesh. Levenberg Marquardt is one optimization algorithm which may be used although other optimization algorithms such as gradient descent are also usable. In an example, the energy terms comprise a 3D data term (on landmark vertices or all the vertices) and identity priors (such as terms minimizing the L1 or L2 norm of beta or a Gaussian Mixture Model.

In an example the 3D data term is $E_{Landmarks} := \Sigma_{j \in L} \| T_j - M(\beta)_j \|^2$ which is expressed in words as an energy over landmarks of the target mesh is equal to the sum over vertices of the target mesh of the square of the magnitude of the difference between the target mesh vertex and the corresponding vertex of a personalized mesh in the target family. The symbol L denotes the set of landmark vertex indices (or all vertex indices). The symbol $T_j$ denotes the jth vertex of the target mesh. The symbol $M(\beta)_j$ denotes the jth vertex of $M(\beta)$.

In an example the identity prior using an L1 norm is $E_{IdentityL1} := |\beta|_1$ The process of FIG. 4 is an efficient and effective way of computing a stylized animatable representation of a subject. The process of FIG. 4 is scalable since the process of computing 400 the mesh mapping and selecting 406 from the family is efficient. Because the mesh mapping is computed 400 using the model 108 that was formed using a data set of training examples 128 that pair realistic representations of other subjects with instances of the family, the mesh mapping is able to apply style of the family to the realistic representation 118. Using a mesh mapping is computationally efficient and scalable. The target mesh retains some likeness of the subject depicted in the realistic representation because of the way the mesh mapping is computed using the model 108.

In some embodiments the model 108 is a trained machine learning model. Any machine learning model may be used such as a convolutional neural network, a random decision forest, a support vector machine. The trained machine learning model is trained using supervised learning using the training examples 128 which in this embodiment comprise tens of thousands or more examples as in FIG. 2. Any suitable supervised learning algorithm is used depending on the type of machine learning model used. Once trained the machine learning model is used to take as input the realistic representation 118 and predict the target mesh 404. In so doing the trained machine learning model has effectively computed a mesh mapping 400 and applied 402 the mesh mapping to the realistic representation 118 to produce a target mesh 404 although these processes are part of the overall trained machine learning model inference process and are not easily separated from that inference process. By using a machine learning model it is possible to accurately transfer style from the training examples 128 to the realistic representation 118. Using a machine learning model gives the benefit of generalization; that is the target mesh 404 is accurate even where the realistic representation differs from the training examples 128.

In some embodiments the model is used to compute the mesh mapping 400 using vertex displacements observed in a plurality of the training examples. The plurality of the training examples are selected from the data set of training examples 128 as nearest neighbors of the realistic representation. In embodiments where the model is used to compute the mesh mapping 400 using vertex displacements the number of training examples 128 may be around 20 and the number of nearest neighbors may be around 3. In some cases the data set comprises only tens of training examples. Using such low numbers of training examples and nearest neighbors is unexpectedly found to give good performance and facilitates scalability.

In order to compute the nearest neighbors the realistic representation 118 comprising a 3D mesh is compared with a realistic representation 3D mesh of each of the training examples 128. The comparison is computed using any suitable similarity metric such as a mesh to mesh distance or a distance between semantic representations. In some cases the mesh to mesh distance compares each vertex to its corresponding vertex in the other mesh. In some cases comparisons are made between only a subset of the mesh vertices, such as those which represent keypoints. The training examples are then ranked according to the similarity metric and the top k are selected. In an example k is 3. However, other values of k are usable.

In some examples a retopology is computed prior to comparing the meshes. The retoplogy comprises adjusting the mesh of the realistic representation 118 to have the same number of vertices as each of the meshes of the training examples 128. In this way there is a one to one mapping between vertices in the realistic representation and vertices in a mesh of a training example. Where the mesh mappings are already generally aligned there is no need for the alignment operation.

In some examples, a scale-invariant alignment is applied to the mesh of the realistic representation 118; either to the retopologised mesh of the realistic representation or direct to the mesh of the realistic representation in the case no retopologisation is done.

Once the top k training examples are identified, per vertex displacements are computed for each of the k training examples. The per vertex displacements for a given training example are the displacements which have to be applied to a 3D mesh of a realistic representation in a training pair to reach a 3D mesh of a stylized representation in the training pair. As a result there are k sets of per vertex displacements. The k sets of per vertex displacements are aggregated. The aggregation is any suitable aggregation such as a weighted average, a median, a mode or other aggregation. In the case of a weighted average the weight may take into account the similarity metric obtained when computing the nearest neighbors. A benefit of using a weighted average is that the influence of the k training examples may take into account similarity between the realistic representation and the training examples.

In another example, the k sets of per vertex displacements are aggregated prior to the result of the aggregation being applied to the target mesh.

The vertex displacement process is found to be efficient and effective especially since applying the mesh mapping 402 as a vertex displacement may be carried out in parallel for each of the vertices and the displacement is efficient to implement in a computing device.

In some embodiments the model is used to compute the mesh mapping 400 as one or more warps. Using warps is more powerful than using only vertex displacements so that the mesh mapping 400 is able to apply more variety of style in a concise way. In an example, k nearest neighbors of the realistic representation are computed as explained above. The k nearest neighbors are training examples. For each of the k nearest neighbors (which are training examples), a warp is computed which transforms the 3D mesh of the realistic representation of the training example into the 3D mesh of the stylized representation of the training example. As a result k warps are determined. In some cases, each of the k warps is applied to the realistic representation 118 to produce k intermediate target meshes. The k intermediate target meshes are then aggregated to produce target mesh 404. The aggregation method is any suitable aggregation such as a weighted average, a median, a mode or other aggregation. A benefit of producing k target meshes which are aggregated is that warp kernels may be used to compute the k target meshes. In contrast, aggregating warp kernels produces unexpected results in some cases since aggregating warp kernels may lead to loss of accuracy in some cases.

In other cases, the k warps are aggregated to produce an aggregated warp which is then applied to the realistic representation 118 to produce the target mesh 404. Aggregating the k warps gives workable results and leads to efficiencies since there is no need to store k intermediate target meshes.

In embodiments where the model is used to compute the mesh mapping 400 using a warp the number of training examples 128 may be around 20 and the number of nearest neighbors may be around 3. In some cases the data set comprises only tens of training examples. Using such low numbers of training examples and nearest neighbors is unexpectedly found to give good performance and facilitates scalability where warps are used.

In various examples the mesh mapping is a learned vertex displacement as now explained. The computation is found to be extremely efficient in these examples.

Let N be the number of training examples.

Let k be the number of nearest neighbour training examples.

Let $j \in \{0, \ldots, N-1\}$ be an example index.

Let $W^j \mathbb{R}^3 \to \mathbb{R}^3$ be the warp function (also referred to as a space warp) capturing the stylization of example j.

Let $d \in \{x, y, z\}$ be a spatial dimension.

Let $W^{j,d}: \mathbb{R}^3 \to \mathbb{R}^3$ be the warp function capturing the stylisation of example j along dimension d.

Let V be the number of vertices in the mesh.

Let $(x_i^j, y_i^j, z_i^j)$ be the ith kernel centre (vortex location) of example input j.

Let M be a mesh to warp.

Let M' be an output mesh.

Let v=(x,y,z) be a vertex of M.

Let v'=(x', y', z') be a vertex of M'.

Let $D^j$ be a per-vertex displacement function capturing the stylisation of example j.

In the case of only a single "training pair" such as a mean mesh from each family, the same per-vertex displacement is applied to all subjects as follows:

$$M'=M+D^{shared}$$

Where a plurality of nearest neighbors are used the output mesh is computed as $$M' = M + \left(\frac{1}{k}\right)\sum_{j \in neighbors} D^j$$

which is expressed in words as the output mesh is equal to the input mesh plus the average over the neighbors of the displacements of the vertices.

Examples in which the mesh mapping is a warp such as a space warp are now described. In an example, a warp function is one or more thin plate splines (TPS). Each TPS encodes displacement along one spatial dimension and may be implemented as a sum of V "linear" kernels plus an overall affine term.

For all vertices v of the realistic representation 118 mesh aligned with training example j apply a space warp as follows:

$$v'=v+W^j(v)$$

Which is achieved by computing a space warp for each of three spatial dimensions x, y and z as follows $$v'\cdot x = v \cdot x + W^{j,x}(x,y,z)$$

$$v'\cdot y = v \cdot y + W^{j,y}(x,y,z)$$

$$v'\cdot z = v \cdot z + W^{j,z}(x,y,z)$$

With the result that the vertex v' of the realistic representation 118 mesh is stylized like training example j.

A thin plate spline computation is expressed as follows:

For $d \in \{x, y, z\}$: (1)

$$W^{j,d}(x, y, z) := a_0^{j,d} + a_x^{j,d}x + a_y^{j,d}y + a_z^{j,d}z + \sum_{i=0}^{V-1} w_i^{j,d}\left\|\left(x_i^j, y_i^j, z_i^j\right) - (x, y, z)\right\|$$

The a terms in equation 1 are scalar coefficients which are calculated from the input pair M M'. Equation 1 is expressed in words as a warp capturing the stylization of training example j in spatial dimension d is equal to a sum of scalar coefficients calculated from input pair M' (the 3D meshes of the training example) plus a learned weight of the thin plate spline for a given vertex index, index into the artist examples and spatial dimension times the sum over vertices of the magnitude of the displacement between the vertices in each dimension.

A single warp may be computed as follows:

$$M'=M+W^j(M) \quad (2)$$

which is calculated per vertex. For each vertex v∈M, the corresponding warped vertex v'∈M' is:

$$v'=v+W^j(v) \quad (3)$$

where the three dimension are warped individually $$v'\cdot x = v \cdot x + W^{j,x} \quad (4)$$

$$v'\cdot y = v \cdot y + W^{j,y}(x,y,z) \quad (5)$$

$$v'\cdot z = v \cdot z + W^{j,z}(x,y,z) \quad (6)$$

A k nearest neighbors warp computation may be calculated as follows $$M'=M+(1/k)\Sigma_{j\in neighbors}W^j(M) \quad (7)$$

Which is expressed in words as a warped mesh M' is equal to a mesh to be warped M plus an average of the warps applied to each of the meshes M of the k training examples.

Figure 5:
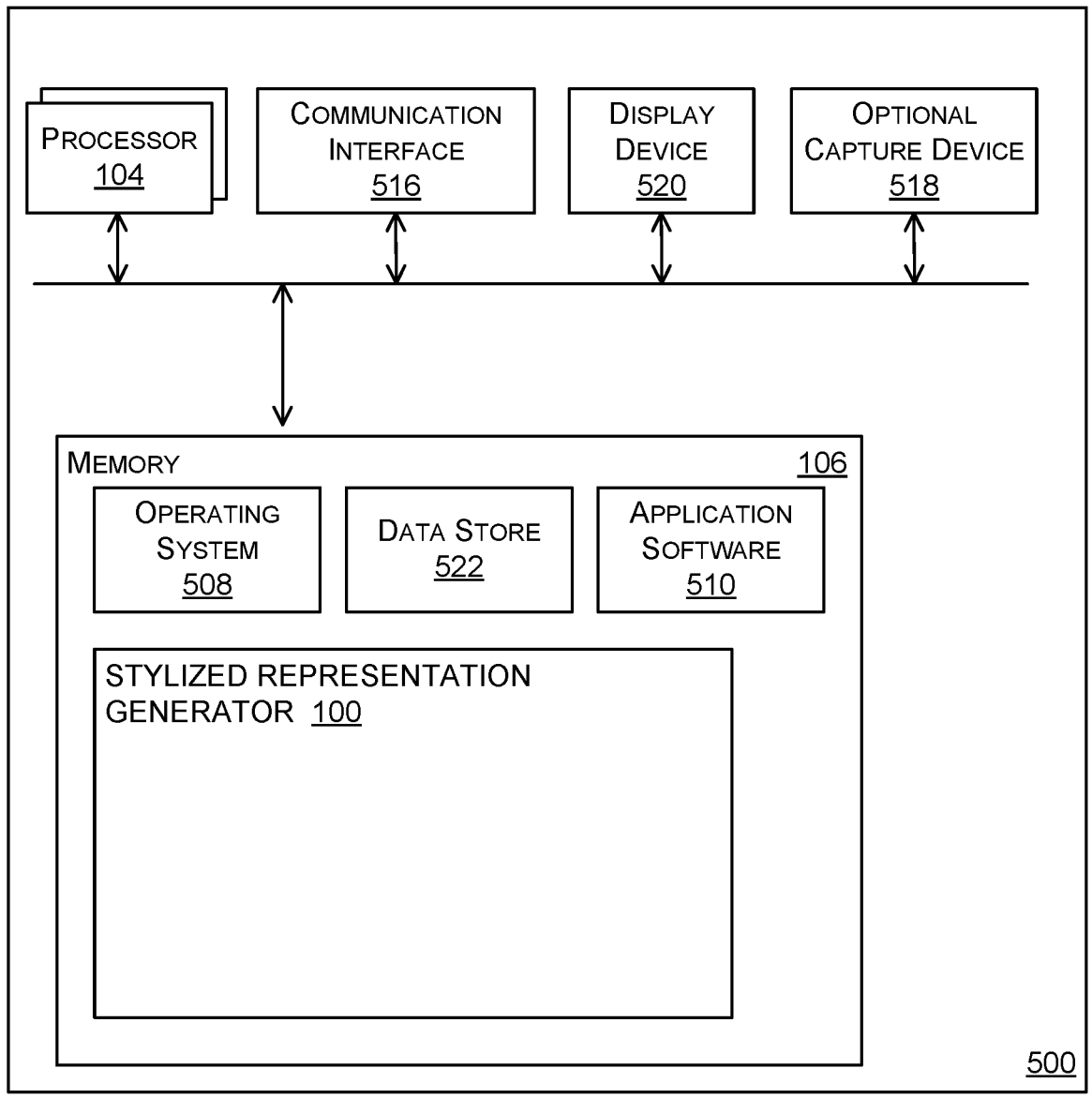
FIG. 5 illustrates an exemplary computing-based device in which embodiments of a stylized representation generator are implemented.

FIG. 5 illustrates various components of an exemplary computing-based device 500 which are implemented as any form of a computing and/or electronic device, and in which embodiments of a stylized representation generator 100 are implemented in some examples.

Computing-based device 500 comprises one or more processors 104 which are microprocessors, controllers or any other suitable type of processors for processing computer executable instructions to control the operation of the device in order to compute stylized animatable representations of subjects. In some examples, for example where a system on a chip architecture is used, the processors 104 include one or more fixed function blocks (also referred to as accelerators) which implement a part of the method of any of FIGS. 3 and 4 in hardware (rather than software or firmware). Stylized representation generator 100 functionality is deployed at the computing-based device 500. Platform software comprising an operating system 508 or any other suitable platform software is provided at the computing-based device to enable application software 510 to be executed on the device. Data store 522 holds values of coefficients, results of nearest neighbor computations, training examples, 3D mesh models, families of stylized representations, rendered images and other data.

The computer executable instructions are provided using any computer-readable media that is accessible by computing based device 500. Computer-readable media includes, for example, computer storage media such as memory 106 and communications media. Computer storage media, such as memory 106, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 106) is shown within the computing-based device 500 it will be appreciated that the storage is, in some examples, distributed or located remotely and accessed via a network or other communication link (e.g. using communication interface 516).

The computing-based device 500 optionally comprises a capture device 518 such as a camera for capturing images of subjects. The computing-based device optionally comprises a display device 520 for displaying images rendered from the stylized animatable representation. The display device 520 may also display other information such as training examples, results of nearest neighbor computations and other data.

Alternatively or in addition to the other examples described herein, examples include any combination of the following:

Clause A. A method of computing a stylized, animatable representation of a subject from a family of stylized animatable representations, the method comprising the steps of:
  accessing a realistic representation of the subject;
  computing a mesh mapping using a model that was formed using a data set of training examples which pair realistic representations of other subjects with instances of the family;
  applying the mesh mapping to the realistic representation of the subject to produce a target mesh; and
  selecting the stylized animatable representation from the family, by assessing closeness of the target mesh with instances of the family. By using a mesh mapping it is possible to efficiently produce the target mesh. The target mesh is then used to select from the family such as by finding an instance from the family which is closest to the target mesh in terms of a similarity metric. The family may have hundreds of thousands or more instances within the family. By computing the target mesh and then selecting from the family, a scalable way to create the stylized representation is given which scales up for web scale applications such as where personal, stylized avatars are to be created for millions of people.

Clause B. A method as claimed in clause A wherein the model is a trained machine learning model. By using a trained machine learning model it is possible to generalize from the training examples; that is, even if the subject differs significantly from the subjects depicted in the training examples, the trained machine learning model is able to generalize from the training examples and produce a mesh mapping which is appropriate and enables likeness of the subject to be preserved.

Clause C. A method as claimed in clause A wherein the model is used to compute the mesh mapping using vertex displacements observed in a plurality of the training examples. By using vertex displacements an extremely efficient way of creating the stylized representation is given since vertex displacements may be applied to the realistic representation in an efficient manner.

Clause D. A method as claimed in clause C wherein the plurality of the training examples are selected from the data set as nearest neighbors of the realistic representation. By using nearest neighbors of the realistic representation efficiency is improved since it is not necessary to use all the training examples. In addition, nearest neighbors may be computed in an efficient manner.

Clause E. A method as claimed any preceding clause comprising, prior to selecting the plurality of training examples, computing a retopology of the realistic representation. By computing a retopology accuracy is improved since applying the mesh mapping is facilitated. In an example, the retopology adjusts a total number of vertices of the realistic representation to match a total number of vertices of the mesh mapping.

Clause E1. The method of any preceding clause 1 comprising computing the mesh mapping by deriving the mesh mapping from a space warp.

Clause F. The method of any preceding clause wherein the mesh mapping is computed by computing, for each of a plurality of the training examples, a warp and subsequently aggregating the warps, and wherein the plurality of the training examples are selected from the data set as nearest neighbors of the realistic representation. By using warps an effective way of applying the mesh mapping is given which is found to give good results in practice.

Clause G. The method of any preceding clause wherein the mesh mapping is computed by computing, for each of a plurality of the training examples selected from the data set as nearest neighbors of the realistic representation, a separate warp. Using a plurality of separate warps enables information from more than one of the training examples to be used in an efficient manner.

Clause H. The method of clause G wherein applying the mesh mapping comprises separately applying each of the separate warps to the realistic representation to obtain a plurality of warped realistic representations, and aggregating the plurality of warped realistic representations. By aggregating after warping it is possible to use kernels in the warping process in order to give an efficient and effective process.

Clause I. The method of any preceding clause wherein the data set comprises only tens of training examples. Using only tens of training examples is beneficial since obtaining training examples is time consuming and costly. Using large numbers of training examples also makes the process harder to scale. It has been found that the method works well even for low numbers of training examples, such as about 20 training examples.

Clause J. The method of any preceding clause wherein the stylized animatable representation is a rigged model. Using a rigged model facilitates fine grained, accurately controllable animation.

Clause K. The method of any preceding clause wherein the realistic representation is a mesh model, or an image of the subject from which a mesh model is derived. By using a mesh model the ability to compute the mesh mapping is facilitated.

Clause L. The method of any preceding clause wherein the family of stylized animatable representations are stylized representations which are related in style and comprises representations of different subjects. By using this type of family it is possible to create stylized representations of different subjects whilst using the same style.

Clause M. The method of any preceding clause wherein a subject is at least part of a person or animal. By creating a stylized representation an avatar of a whole person or animal is obtained for use in one or more downstream processes such as a computer game, a video conference or the Metaverse. In some cases, the stylized representation may be of part of a person or animal, such as a head and shoulders, or a face.

Clause N. The method of any preceding clause wherein assessing closeness of the target mesh with instances of the family comprises optimizing an energy function comprising a geometrical residual term and an identity prior term. By using a optimization to assess closeness a principled, accurate way of selecting the instance of the family is given.

Clause O. An apparatus for computing a stylized, animatable representation of a subject from a family of stylized animatable representations, the apparatus comprising:
at least one processor;
a memory storing a realistic representation of the subject and storing instructions which when executed by the at least one processor:
compute a mesh mapping using a model that was formed using a data set of training examples which pair realistic representations of other subjects with instances of the family;
apply the mesh mapping to the realistic representation of the subject to produce a target mesh; and
select the stylized animatable representation from the family, by assessing closeness of the target mesh with instances of the family.

Clause P. A method of computing a stylized, animatable 3D representation of a subject from a family of stylized animatable 3D representations, the method comprising the steps of:
accessing a realistic representation of the subject;
computing a mesh mapping using a model that was formed using a data set of training examples which pair realistic representations of other subjects with instances of the family;
applying the mesh mapping to the realistic representation of the subject to produce a target 3D mesh; and
selecting the stylized animatable representation from the family, by assessing closeness of the target 3D mesh with instances of the family.

Clause Q. The method of clause P comprising rendering images from the selected stylized animatable representation. The rendered images may be stored or used in downstream processes, such as being inserted into a video conference stream, video game, or displayed using a display device.

Clause R. The method of clause P or clause Q comprising receiving values of parameters of the selected stylized animatable representation; applying the received values to the selected stylized animatable representation and rendering images from the selected stylized animatable representation. In this way precise, detailed animation of an avatar is achieved in an efficient manner which may be achieved in real time.

Clause S. The method of any of clauses P to R comprising adding the images to a video. By adding the images to a video avatars may be added to games, video conferences or other content.

Clause T. The method of any of clauses P to S wherein the selected stylized animatable representation preserves likeness of the subject depicted in the realistic representation. Preserving the likeness of the subject is extremely useful since it facilitates human computer interaction through use of the animated avatar.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method of computing a stylized, animatable representation of a subject from a family of stylized animatable representations, the method comprising:
    accessing a realistic representation of the subject;
    computing a mesh mapping using a model that was formed using a data set of training examples which pair realistic representations of other subjects with instances of the family, wherein computing the mesh mapping comprises:
        selecting the training examples from nearest neighbors of the realistic representation;
        computing a warp for each of the training examples; and
        aggregating the warps;
    applying the mesh mapping to the realistic representation of the subject to produce a target mesh; and
    selecting the stylized animatable representation from the family, based on closeness of the target mesh with instances of the family.

2. The method of claim 1 wherein the model is a trained machine learning model.

3. The method of claim 1 wherein the model is used to compute the mesh mapping using vertex displacements observed in the training examples.

4. The method of claim 3 wherein the training examples are selected from the data set as nearest neighbors of the realistic representation.

5. The method of claim 1 comprising, prior to applying the mesh mapping, computing a retopology of the realistic representation.

6. The method of claim 1 comprising computing the mesh mapping by deriving the mesh mapping from a space warp.

7. The method of claim 1 wherein the mesh mapping is computed by computing, for each of the training examples selected from the data set as nearest neighbors of the realistic representation, a separate warp.

8. The method of claim 7 wherein applying the mesh mapping comprises separately applying each of the separate warps to the realistic representation to obtain a plurality of warped realistic representations, and aggregating the plurality of warped realistic representations.

9. The method of claim 1 wherein the training examples comprises between ten to twenty training examples.

10. The method of claim 1 wherein the stylized animatable representation is a rigged model.

11. The method of claim 1 wherein the realistic representation is a mesh model, or an image of the subject from which a mesh model is derived.

12. The method of claim 1 wherein the family of stylized animatable representations are stylized representations which are related in style and comprises representations of different subjects.

13. The method of claim 1 wherein a subject is at least part of a person or animal.

14. The method of claim 1 wherein the method further includes:
    assessing the closeness of the target mesh with the instances of the family is performed by optimizing an energy function comprising a geometrical residual term and an identity prior term.

15. An apparatus for computing a stylized, animatable representation of a subject from a family of stylized animatable representations, the apparatus comprising:
    a processor;
    a memory storing a realistic representation of the subject and storing instructions which when executed by the processor:
        compute a mesh mapping using a model that was formed using a first training example and a second training example which pair realistic representations of other subjects with instances of the family, wherein computing the mesh mapping comprises:
            selecting the first training example and the second training example from nearest neighbors of the realistic representation;
            computing a warp for each of the first training example and the second training example; and
            aggregating the warps;

apply the mesh mapping to the realistic representation of the subject to produce a target mesh; and select the stylized animatable representation from the family, based on closeness of the target mesh with instances of the family.

16. The apparatus of claim 15, wherein the selected stylized animatable 3D representation preserves likeness of the subject depicted in the realistic representation.

17. A method of computing a stylized, animatable three dimensional (3D) representation of a subject from a family of stylized animatable 3D representations, the method comprising:

accessing a realistic representation of the subject;

computing a mesh mapping using a model that was formed using training examples which pair realistic representations of other subjects with instances of the family, wherein computing the mesh mapping comprises:

selecting the training examples from nearest neighbors of the realistic representation;

computing a warp for each of the training examples; and aggregating the warps;

applying the mesh mapping to the realistic representation of the subject to produce a target 3D mesh; and selecting the stylized animatable 3D representation from the family, based on closeness of the target 3D mesh with instances of the family.

18. The method of claim 17 comprising rendering images from the selected stylized animatable 3D representation.

19. The method of claim 17 comprising:

receiving values of parameters of the selected stylized animatable 3D representation; and applying the received values to the selected stylized animatable 3D representation and rendering images from the selected stylized animatable 3D representation.

20. The method of claim 17 wherein the selected stylized animatable 3D representation preserves likeness of the subject depicted in the realistic representation.

* * * * *